W. F. BLEECKER.
PROCESS OF PURIFYING VANADIUM.
APPLICATION FILED MAY 24, 1912.

1,065,582. Patented June 24, 1913.

*a* ---- ADD LEAD SULPHATE TO ACID SOLUTION OF VANADIUM CONTAINING IMPURITIES ----

*b* ---------------------- ADD SODIUM CARBONATE ----------------

LEAD VANADATE      SOLUTION CONTAINING IMPURITIES
(INSOLUBLE)      $FeCl_2$ ---- $AlCl_3$ ---- $CaCl_2$ ---- $MgCl_2$ ETC.

*c* ---------------------- FILTRATION ----------------

LEAD VANADATE

*d* ---------------------- TREATMENT WITH SULPHURIC ACID ----------------

VANADYL SULPHATE ---- LEAD SULPHATE
(SOLUBLE)      (INSOLUBLE)

WITNESSES
INVENTOR
W. F. Bleecker
By H. A. Seymour
Attorney

UNITED STATES PATENT OFFICE.

WARREN F. BLEECKER, OF CANONSBURG, PENNSYLVANIA, ASSIGNOR TO THE STANDARD CHEMICAL COMPANY, OF PITTSBURGH, PENNSYLVANIA.

PROCESS OF PURIFYING VANADIUM.

1,065,582. Specification of Letters Patent. Patented June 24, 1913.

Application filed May 24, 1912. Serial No. 699,597.

*To all whom it may concern:*

Be it known that I, WARREN F. BLEECKER, a resident of Canonsburg, in the county of Washington and State of Pennsylvania, have invented certain new and useful Improvements in Processes for Purifying Vanadium; and I do hereby declare the following to be a full, clear, and exact description of the invention, such as will enable others skilled in the art to which it appertains to make and use the same.

This invention relates to an improved process of purifying vanadium,—the object of the invention being to obtain vanadium free from impurities.

With this object in view, the invention consists in certain novel steps in the process of purifying vanadium in solutions or liquors, as hereinafter described and pointed out in the claims.

The accompanying drawing is a diagrammatical illustration of my improved process.

In carrying out my improved process, I take an acid solution of vanadium, such as may be obtained by acid treatment of carnotite or vanadiferous ores. This solution may be heated to about 90° C., and sufficient lead salt (such as lead sulfate, for example) will be added as will form lead vanadate. The exact quantity of lead salt may be determined by an analysis of the vanadium liquor, to ascertain the vanadium content. An alkaline carbonate (such as sodium carbonate, for example) will next be added to the solution until the vanadium is precipitated, as lead vanadate probably $(PbO)_3.V_2O_5$. The solution now contains practically all the lime, iron, aluminum, silica and magnesia, contained in the original solution or liquor. The lead vanadate (which is practically free from all the impurities above mentioned) will next be removed from the solution by filtration.

The vanadium may be removed from the lead vanadate by treatment with acid, preferably $H_2SO_4$ forming vanadyl sulfate. Lead sulfate will thus be precipitated (and may be again used in the first step of the process), and the resultant liquor will be an acid solution of vanadium free from all the impurities before alluded to,—viz. lime, iron, aluminum, silica and magnesia.

In the drawing, the various steps of the process are represented by the reference characters $a$, $b$, $c$, $d$, and the products of the steps $b$, $c$, $d$ are also indicated.

Having fully described my invention, what I claim as new and desire to secure by Letters Patent is:

1. The herein described process, consisting in adding a lead salt to an acid solution containing vanadium and impurities, then adding an alkaline carbonate to the solution, and removing from the solution, lead vanadate free from impurities.

2. The herein described process, consisting in adding lead salt to an acid solution of vanadium, precipitating lead vanadate in said solution, and recovering vanadium from the lead vanadate precipitate.

3. The herein described process, consisting in subjecting vanadiferous ore to the action of an acid to form an acid solution containing vanadium and impurities. adding a lead salt to said solution, then treating the solution with an alkali, and recovering precipitated lead vanadate free from impurities.

4. The herein described process of purifying vanadium, consisting in adding lead salt to an acid solution containing vanadium, treating the solution to precipitate lead vanadate, removing the precipitated lead vanadate, treating the precipitated lead vanadate with acid, and recovering an acid solution of vanadium free from impurities.

5. The herein described process of purifying vanadium, consisting in adding lead salt to an acid solution containing vanadium and impurities, then adding to the solution, an alkaline carbonate until lead vanadate is precipitated, treating the lead vanadate precipitate with sulfuric acid, and recovering lead sulfate and an acid solution of vanadium free from impurities.

In testimony whereof, I have signed this specification in the presence of two subscribing witnesses.

WARREN F. BLEECKER.

Witnesses:
 Jos. A. KELLY,
 HARRY A. KANELING.

Copies of this patent may be obtained for five cents each, by addressing the "Commissioner of Patents, Washington, D. C."